(12) United States Patent
Vrind et al.

(10) Patent No.: US 12,231,219 B2
(45) Date of Patent: Feb. 18, 2025

(54) METHODS AND SYSTEMS FOR SHARING AERIAL ASSETS AMONGST TERRESTRIAL NETWORK OPERATORS

(71) Applicant: SAMSUNG ELECTRONICS CO., LTD., Suwon-si (KR)

(72) Inventors: Tushar Vrind, Karnataka (IN); Lalit Kumar Pathak, Karnataka (IN); Sudharshan Rao B, Karnataka (IN); Debabrata Das, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 17/754,073

(22) PCT Filed: Sep. 24, 2020

(86) PCT No.: PCT/KR2020/012998
§ 371 (c)(1),
(2) Date: Mar. 23, 2022

(87) PCT Pub. No.: WO2021/060885
PCT Pub. Date: Apr. 1, 2021

(65) Prior Publication Data
US 2022/0345203 A1    Oct. 27, 2022

(30) Foreign Application Priority Data

Sep. 24, 2019  (IN) .............................. 201941038569
Sep. 22, 2020  (IN) .............................. 201941038569

(51) Int. Cl.
*H04B 7/185*  (2006.01)
*H04W 24/02*  (2009.01)
*H04W 28/08*  (2023.01)

(52) U.S. Cl.
CPC ........ *H04B 7/18504* (2013.01); *H04W 24/02* (2013.01); *H04W 28/0846* (2020.05)

(58) Field of Classification Search
CPC .............. H04B 7/18504; H04W 24/02; H04W 28/0846; H04W 16/26; H04W 16/18; H04W 16/22
See application file for complete search history.

(56) References Cited

U.S. PATENT DOCUMENTS 8,364,155 B1 *  1/2013  Ahmed ................. H04W 16/22
                                                    455/446
9,363,008 B2    6/2016  Boss et al.
(Continued)

FOREIGN PATENT DOCUMENTS

CN     106416345    2/2017
CN     109862585    6/2019
(Continued)

OTHER PUBLICATIONS

Qianqian Zhang et al: "Predictive Deployment of UAV Base Stations in Wireless Networks: Machine Learning Meets Contract Theory", arxiv.org, Cornell University Library, 201 Olin Library Cornell University Ithaca, NY 14853, Nov. 3, 2018 (Nov. 3, 2018), XP081557399.
(Continued)

*Primary Examiner* — Christine Ng
(74) *Attorney, Agent, or Firm* — F. CHAU & ASSOCIATES, LLC (57) ABSTRACT

Methods and systems for sharing aerial assets amongst terrestrial network operators. Embodiments enable sharing of aerial assets amongst the terrestrial network operators and facilitate on-demand deployment of the aerial cells to improve coverage and capacity of the terrestrial network operators. Embodiments allow sharing of aerial assets such as aerial cell mount, backhaul, an aerial RAN, and aerial spectrum using sharing architectures. Embodiments provide a managing entity for forecasting data traffic pertaining to the terrestrial network operators and optimizing the deployment of the aerial cells, based on the forecasted data traffic, for enabling strategic deployment of the aerial cells. Embodiments ensure that the resources of the aerial cells are (Continued)

effectively utilized and the number of aerial cells required for enhancing the capacity of the terrestrial network operators is minimized.

16 Claims, 4 Drawing Sheets

(56) References Cited

U.S. PATENT DOCUMENTS

| | | | |
|---|---|---|---|
| 10,292,062 | B2 | 5/2019 | Centonza et al. |
| 10,645,018 | B2 | 5/2020 | Kubba |
| 2003/0176192 | A1 | 9/2003 | Morimoto et al. |
| 2009/0209223 | A1* | 8/2009 | Kone .................. H04B 1/0475 455/343.1 |
| 2010/0165882 | A1* | 7/2010 | Palanki ................ H04W 76/14 370/254 |
| 2010/0265867 | A1 | 10/2010 | Becker et al. |
| 2011/0086641 | A1* | 4/2011 | Guvenc ................ H04W 36/04 455/437 |
| 2011/0190003 | A1* | 8/2011 | Hiltunen ............. H04W 72/542 455/452.1 |
| 2014/0092803 | A1 | 4/2014 | Picker |
| 2016/0028471 | A1 | 1/2016 | Boss et al. |
| 2016/0295429 | A1 | 10/2016 | Enqvist |
| 2017/0034706 | A1 | 2/2017 | Ericson et al. |
| 2017/0034711 | A1 | 2/2017 | Tsuda |
| 2017/0126309 | A1 | 5/2017 | Rupasinghe et al. |
| 2018/0083671 | A1 | 3/2018 | Alexander et al. |
| 2018/0184463 | A1 | 6/2018 | Fakoorian et al. |
| 2018/0262413 | A1* | 9/2018 | Sureka ................ H04L 43/0876 |
| 2018/0267524 | A1 | 9/2018 | Chen et al. |
| 2019/0112039 | A1 | 4/2019 | Pfaller et al. |
| 2019/0155660 | A1* | 5/2019 | McQuighan .......... G06F 9/5022 |
| 2019/0297555 | A1* | 9/2019 | Hampel ............... H04L 47/263 |
| 2020/0245208 | A1* | 7/2020 | Tsuda .................... H04W 36/08 |
| 2020/0252838 | A1 | 8/2020 | Akdeniz et al. |
| 2021/0007037 | A1* | 1/2021 | Sharma ............... H04W 36/322 |
| 2021/0037452 | A1* | 2/2021 | Tsuda .................... B64C 39/024 |
| 2021/0144626 | A1* | 5/2021 | Han ..................... H04B 17/318 |
| 2021/0377936 | A1* | 12/2021 | Yuan ..................... H04W 72/27 |
| 2021/0405655 | A1 | 12/2021 | Yi et al. |

FOREIGN PATENT DOCUMENTS

| | | |
|---|---|---|
| EP | 2938117 | 10/2015 |
| WO | WO 2017-220110 | 12/2017 |
| WO | WO 2018-219443 | 12/2018 |

OTHER PUBLICATIONS

Hu Xuanguang et al: "Deployment of UAV and Interference Coordination in UAV-assisted Cellular Networks", 2018 IEEE/CIC International Conference on Communications in China (ICCC Workshops), IEEE, Aug. 16, 2018 (Aug. 16, 2018), pp. 153-157, XP033532747, DOI: 10.1109/ICCCHINAW.2018.8674489.

Ali Muntadher A et al: "Delay-Oriented Spectrum Sharing and Traffic Offloading in Coexisting UAV-Enabled Cellular and WiFi Networks", 2018 IEEE International Symposium on Dynamic Spectrum Access Networks (DYSPAN), IEEE, Oct. 22, 2018 (Oct. 22, 2018), pp. 1-7, XP033498650, DOI: 10.1109/DYSPAN.2018.86.

Zhang Chiya et al: "Spectrum Sharing in Drone Small Cells", 2016 IEEE Global Communications Conference (GLOBECOM), IEEE, Dec. 4, 2016 (Dec. 4, 2016), pp. 1-6, XP033059012, DOI: 10.1109/GLOCOM.2016.7842290 [retrieved on Feb. 2, 2017].

F. Tariq, et. al: "A speculative study on 6G," arXiv:1902.06700, 2019.

Latva-aho Matti, et.al. "Key drivers and research challenges for 6G", http://urn.fi/urn:isbn:9789526223544 , 2019.

Hsu-Tung Chien, et.al: "Multi-Operator Fairness in Transparent RAN Sharing by Soft-Parlition with Blocking and Dropping Mechanism", IEEE Transactions on Vehicular Technology, 2018.

Faraj Lagum, et.al: "Strategic Densification with UAV-BSs in Cellular Networks" IEEE Wireless Communications Letters, 2018.

Irem Bor-Yaliniz, et.al: "The New Frontier in RAN Heterogeneity: Multi Tier Drone-Cells", IEEE Communications Magazine, 2016.

Hoang Duy Trinh, et.al: 'Mobile Traffic Prediction from Raw Data Using LSTM Networks', IEEE PIMRC, 2018.

Sima Siami-Namini, et.al: "A Comparison of ARIMA and LSTM in Forecasting Time Series", IEEE International Conference on Machine Learning and Applications (ICMLA), 2018.

FG-NET-2030, ITU, "Network 2030 Vision. A Blueprint of Technology, Applications and Market Drivers Towards the Year 2030 and Beyond", 2019.

Yilmaz ONC, Teyeb O, Orsino A, "Overview of LTE-NR dual connectivity" IEEE Communication Magazine 57:387? 144. 2019.

Roshni Chatterjee, Tushar Vrind, "Improved Network Analytics with novel feer quantities for Self-Optimized Networks", EAI Endorsed Trans. Cloud Systems 4(13): e4 , 2018.

Qianqian Zhang, et.al: "Machine Learning for Predictive On-Demand Deployment of UAVs for Wireless Communications" IEEE Global Communications Conference (GLOBECOM), 2018.

Gyunam Park ; Minseok Song: "Prediction-based Resource Allocation using LSTM and Minimum Cost and Maximum Flow Algorithm", Conference on Process Mining (ICPM), 2019.

Amin Azari, et.al: "User Traffic Prediction for Proactive Resource Management: Learning-Powered Approaches", arXiv:1906.00951v1, 2019.

Multi-Tier Drone Architecture for 5G.B5G Cellular Networks Challenges, Trends, and Prospects.

3GPP, Technical Report, 38.811: "Study on New Radio (NR) to support non terrestrial networks" (Release 15), 2018.

TS 22.125 V17.1.0 (Dec. 2019), Unmanned Aerial System (UAS) support in 3GPP; Stage 1.

3GPP, Techical Specification 23.251 "Network Sharing: Architecture and functional description" Release 15. 2018.

3GPP, Technical Specification 32.130, "Network sharing: Concepts and requirements" (Release 14), 2016.

Chiya Zhang, et.al: "Spectrum Sharing for Drone Networks". IEEE Journal on Selected Areas in Communications, 2017.

Office Action dated Aug. 22, 2024 in related U.S. Appl. No. 17/804,782.

* cited by examiner

METHODS AND SYSTEMS FOR SHARING AERIAL ASSETS AMONGST TERRESTRIAL NETWORK OPERATORS

CROSS-REFERENCE TO RELATED APPLICATIONS

The present application is a National Stage application, filed under 35 U.S.C. § 371 of International Patent Application No. PCT/KR2020/012998, filed on Sep. 24, 2020, which claims priority to Indian Provisional Patent Application No. 201941038569, filed on Sep. 24, 2019, and Indian Patent Application No. 201941038569, filed on Sep. 22, 2020, the contents of which are incorporated by reference herein in their entirety.

TECHNICAL FIELD

Embodiments herein relate to aerial communication, and more particularly to methods and systems for enabling on-demand deployment of aerial cells and sharing of assets of aerial cells amongst terrestrial cellular networks.

BACKGROUND

Figure 1:
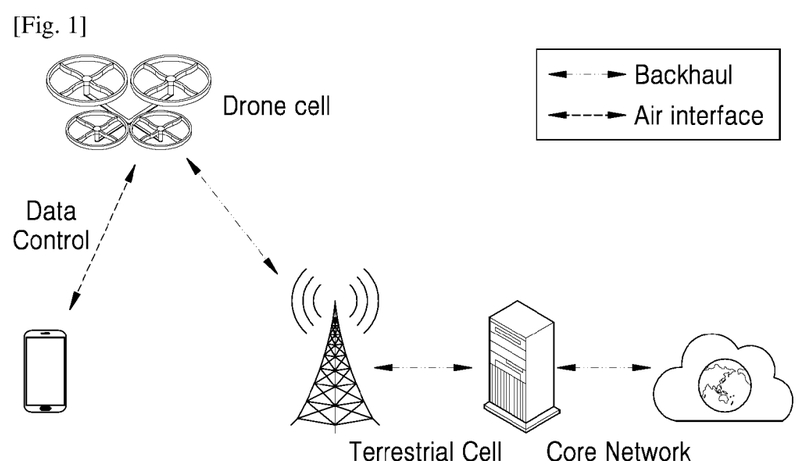
FIGS. 1 and 2 depict the architectures of example networks comprising terrestrial and non-terrestrial network elements.
Figure 2:
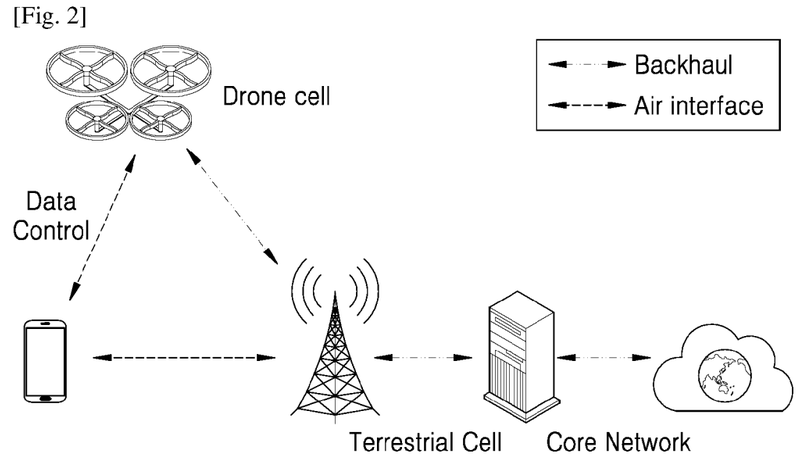

Aerial cells can be used for extending the coverage area and enhancing the capacity of terrestrial cellular networks. Currently, Non-Terrestrial Networks (NTNs), or aerial networks, are considered as a key enabler for dynamic scaling of coverage and capacity of the terrestrial cellular networks. FIGS. 1 and 2 depict architectures of example networks comprising terrestrial and non-terrestrial network elements. Each of the network architectures includes a device, a drone cell, a terrestrial base station, and a terrestrial core network. The non-terrestrial network element in the architectures is the drone cell. The terrestrial network elements are augmented by the drone cell, and interact with the drone cell using backhaul links. As depicted in FIG. 1, the device is connected only with the drone cell using a radio-link (air-interface). The device connects with the terrestrial network elements through the drone cell. As depicted in FIG. 2, the device is connected to both the drone cell and the terrestrial base station using air-interfaces.

Figure 3:
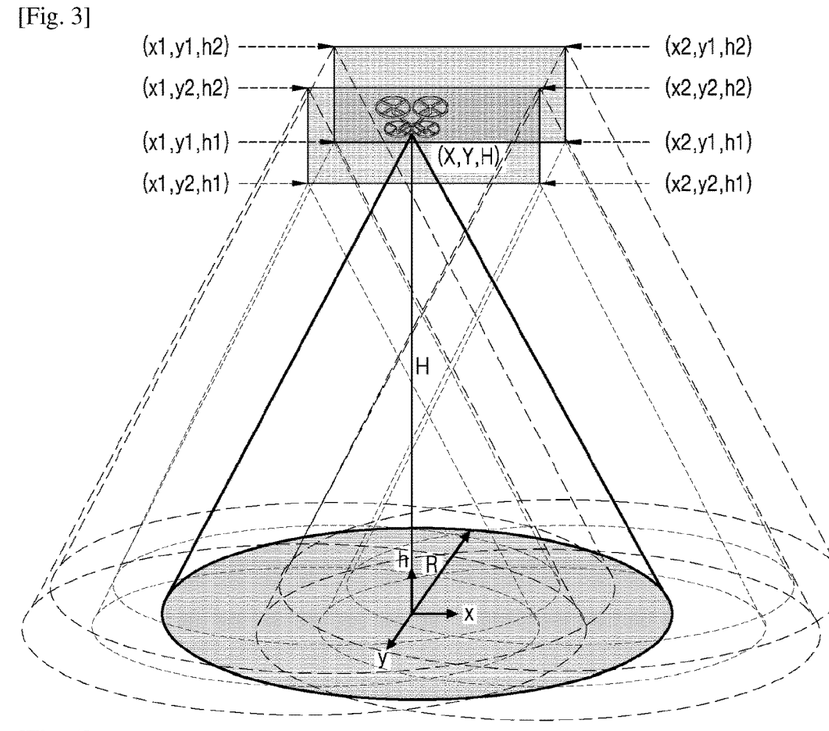
FIGS. 3 and 4 depict 3-Dimensional (3D) and 2D representations of coverage area of an example aerial cell.
Figure 4:
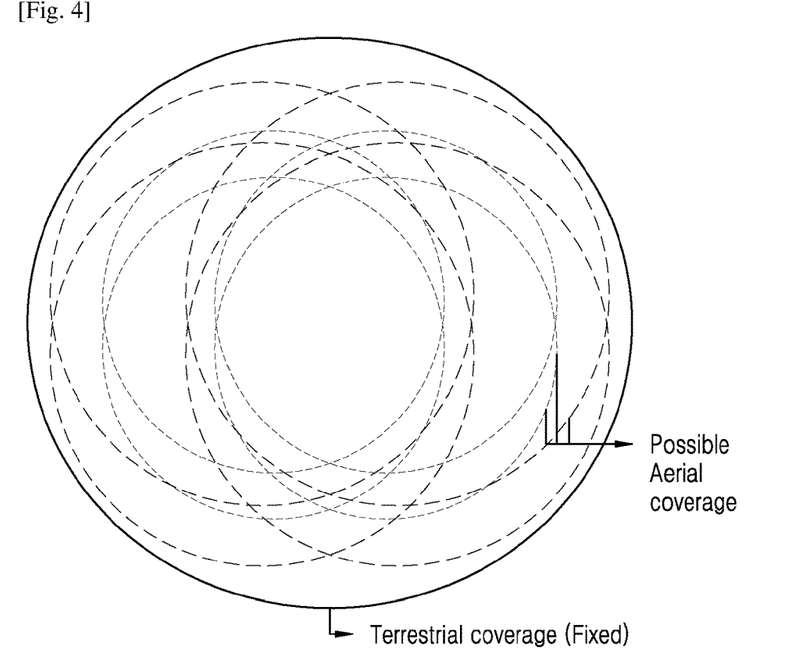

FIGS. 3 and 4 depict the coverage area of an example aerial cell. The aerial cell includes a high altitude International Mobile Telecommunications (IMT) base station, which connects with subscribers of a terrestrial cellular network, and network elements of the terrestrial cellular network. FIG. 3 depicts a 3-Dimensional (3D) representation of the coverage area of the aerial cell. The region that falls within the coverage area of the aerial cell changes based on variation of the coordinates of the aerial cell. FIG. 4 depicts the various regions within the coverage area of the aerial cell.

The coverage area and the position of the aerial cell changes, as per the requirement of resources within the coverage area of the terrestrial cellular network. As depicted in FIG. 4, the coverage area of the terrestrial cellular network is fixed. If a particular region within the coverage area of the terrestrial cellular network does not have sufficient resources to provide services to the subscribers, the aerial cell can be deployed in the particular region for boosting the capacity of the terrestrial cellular network in the particular region. Therefore, the aerial cell can enhance the capacity of the terrestrial cellular network at an on-demand basis. The aerial cells provide reliable Line of Sight (LoS) links, which are immune to the subscriber device mobility based challenges.

However, the feasibility of utilizing the aerial cells, for enhancing the coverage area and the capacity of the terrestrial cells, particularly in terms of cost that is likely to be involved in deployment of the aerial cells and the power consumption of the aerial cells, rests on predicting the requirements of resources by the terrestrial network and ensuring effective utilization of the resources of the aerial cells. In order to maximize the utilization of resources of the aerial cells, it is necessary to strategically deploy an aerial cell in the right location at the right time. The deployment of the aerial cells can be considered as strategic, if the deployment ensures optimization of at least one of coverage area, resource allocation, interference, and energy, considering the altitude of deployment of the aerial cells and the flying time of the aerial cells.

Currently, there are challenges involved in accurately predicting the resource requirements of the terrestrial cellular networks in different locations at different times, which is essential for strategic deployment of the aerial cells and the effective utilization of the aerial cells. One of the primary hurdles in predicting the voice and data traffic of a terrestrial cellular network is the non-homogeneity of the demand for resources by the subscribers of terrestrial cellular network. The demand for the resources is likely to vary throughout the day, across different locations of a terrestrial cell. Further, if the user density in a cell, at a particular location, is dynamic, the uncertainty of demand for resources can increase. The uncertainty is compounded, particularly if the cell density at the particular location largely remains static. Therefore, the accurate prediction of demand for resources and the strategic deployment of the aerial cells remain challenging.

One of the means employed for ensuring the effective utilization of resources, such is bandwidth, is sharing the resources amongst a plurality of network operators. 3rd Generation Partnership Project (3GPP) has defined architectures and guidelines for sharing of aerial infrastructure amongst the terrestrial cellular networks. However, the architecture and the guidelines may not be applicable in scenarios, in which aerial cells need to be dynamically deployed in a location and the resources of the deployed aerial cells need to be optimally shared amongst a plurality of terrestrial cellular operators.

OBJECTS

The principal object of the embodiments herein is to disclose methods and systems for augmenting terrestrial networks by Non-Terrestrial Networks (NTNs), for enhancing the coverage area and capacity of the terrestrial networks.

Another object of the embodiments herein is to deploy an aerial cell (NTN) for improving the coverage and capacity of the terrestrial network, and provide means to share the assets of the aerial cell amongst a plurality of terrestrial network operators.

Another object of the embodiments herein is to provide a plurality of architectures for sharing the aerial assets amongst the plurality of terrestrial network operators, wherein the plurality of architectures comprises a shared aerial cell mount architecture, a shared backhaul architecture, an aerial Multi-Operator Radio Access Networking (MORAN) architecture, and an aerial Multi-Operator Core Networking (MOCN) architecture.

Another object of the embodiments herein is to forecast data traffic pertaining to each of the plurality of terrestrial network operators, manage the deployment of the aerial cells based on the forecasted data traffic, and enable sharing of resources of the aerial cells; based on demand, for resources, of the plurality of terrestrial network operators, wherein the demand for resources is determined based on the forecasted data traffic.

Another object of the embodiments herein is to maximize resource utilization of deployed aerial cells through optimization of aerial cell deployment and trajectory, which ensures improvement of the capacity of the terrestrial networks using a minimum number of aerial cells.

SUMMARY

Accordingly, the embodiments provide methods and systems for enhancing the coverage area and capacity of terrestrial networks by augmenting the terrestrial networks with Non-Terrestrial Networks (NTNs). The embodiments include enabling on-demand deployment of aerial cells (NTNs) for enhancing the capacities of terrestrial network operators, and enabling sharing of aerial assets of the deployed aerial cells amongst the terrestrial network operators. The embodiments include predicting the capacity of at least one terrestrial cell belonging to at least one terrestrial network operator.

The embodiments include determining whether the capacity of the at least one terrestrial network operator is not sufficient to provide services to the subscribers of the at least one terrestrial network operator. The embodiments include predicting that the at least one terrestrial cell will not be able to provide services at a future time instant if the capacity of the at least one terrestrial cell is not sufficient. The embodiments include deploying at least one aerial cell to increase the capacity of the at least one terrestrial cell. The at least one aerial cell can be deployed in the coverage area of the at least one terrestrial cell at time instances during which the capacity of the at least one terrestrial cell has been predicted to be insufficient for providing the services The embodiments include determining the number of aerial cells required for compensating the insufficiency of capacity of the at least one terrestrial cell. The number of required aerial cells (503) can be determined based on the capacities of the aerial cells and the degree of insufficiency. The embodiments include enabling the sharing of at least one asset of the at least one aerial cell based on at least one sharing architecture. The at least one sharing architecture allows sharing/non-sharing of one or more assets of the at least one aerial cell amongst a plurality of terrestrial cells. The assets of the at least one aerial cell include aerial cell mount, backhaul, aerial RAN, and spectrum.

The embodiments include ensuring effective utilization of the resources of the at least one aerial cell through the sharing of at least one aerial asset of the at least one aerial cell amongst the plurality of terrestrial cells. The embodiments include optimizing the deployment of the at least one aerial cell such that the at least one aerial asset of the deployed at least one aerial cell is completely utilized through the sharing of the resources of the at least one aerial cell. The portion of the capacity of the at least one aerial cell that is unutilized can be allocated to at least one other terrestrial cells. The embodiments include ensuring that unutilized portion of resources is minimized.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for enabling sharing of aerial assets and infrastructure of aerial cells amongst a plurality of terrestrial network operators, and enabling on-demand deployment of the aerial cells and associated platforms. The embodiments herein provide architectures for sharing the aerial assets amongst the plurality of terrestrial network operators. The embodiments herein enable the plurality of terrestrial network operators to share aerial assets such as aerial cell mount, backhaul, aerial Radio Access Network (RAN), and aerial spectrum, using the architectures. The embodiments herein provide a managing entity for forecasting data traffic pertaining to the plurality of terrestrial network operators, optimizing the deployment and trajectory of the aerial cells, and sharing of the aerial assets amongst the plurality of terrestrial network operators. The forecasting of data traffic enables strategic deployment of the aerial cells. The optimization of aerial cell deployment and trajectory can ensure that the resources of the aerial cells are effectively utilized and the number of aerial cells (aerial fleet size) required for enhancing the capacity of the plurality of terrestrial network operators is minimized.

Figure 5:
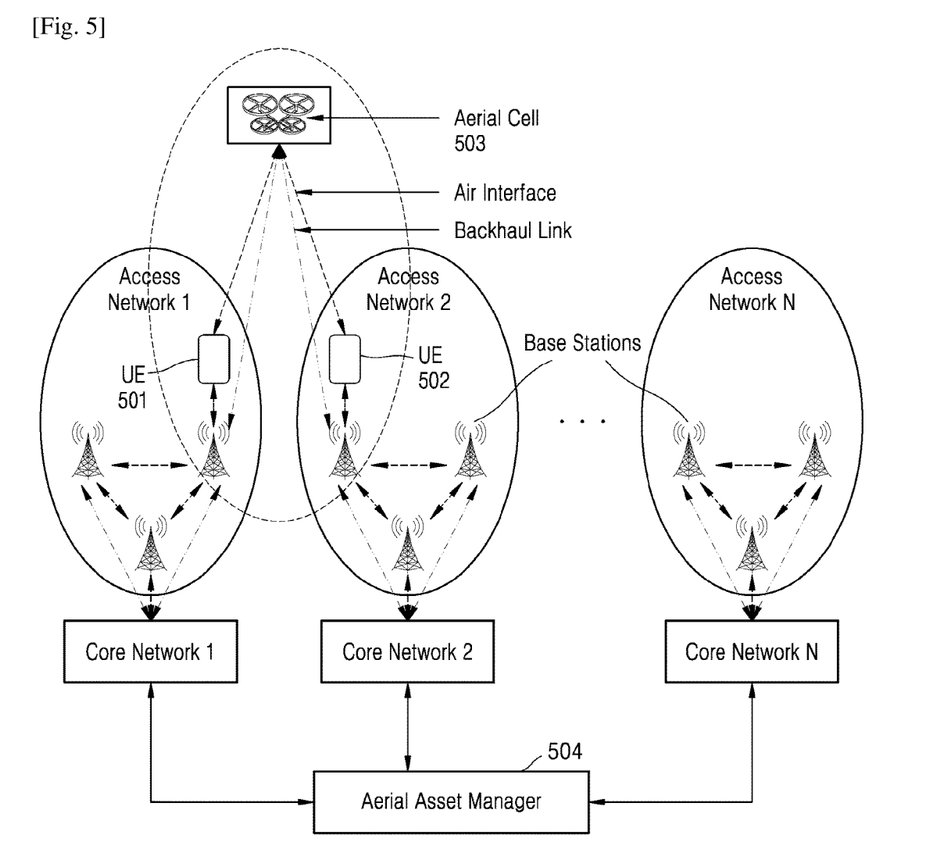
FIG. 5 is an example scenario depicting the sharing of assets of an aerial infrastructure amongst a plurality of terrestrial networks, according to embodiments as disclosed herein.
Figure 6:
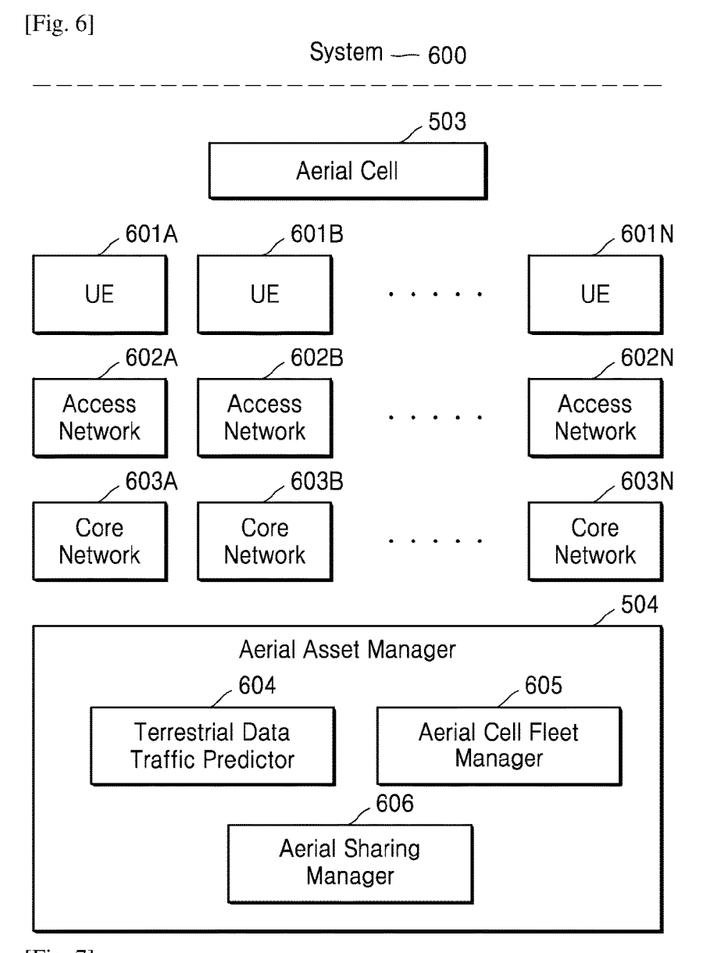
FIG. 6 depicts a system that is configured to enable on-demand deployment of an aerial cell to increase the capacity of terrestrial network operators, and sharing of assets of the aerial cell amongst the terrestrial network operators, according to embodiments as disclosed herein.
Figure 7:
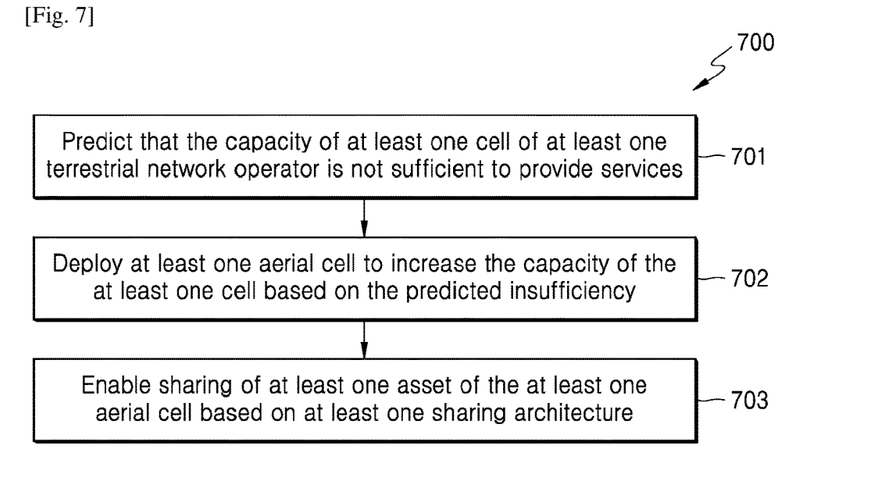
FIG. 7 is a flowchart depicting a method for enabling on-demand deployment of aerial cells for increasing the capacity of the terrestrial network operators, and sharing of aerial assets of the deployed aerial cells amongst the terrestrial network operators, according to embodiments as disclosed herein.

Referring now to the drawings, and more particularly to FIGS. 5 through 7, where similar reference characters denote corresponding features consistently throughout the figures, there are shown preferred embodiments.

FIG. 5 is an example scenario depicting the sharing of assets of an aerial infrastructure amongst a plurality of terrestrial networks, according to embodiments as disclosed herein. Consider that the assets of the aerial infrastructure are shared among 'N' terrestrial networks, which are labeled as operator-1, operator-2, . . . , and operator N. The aerial infrastructure can be considered to be an aerial cell 503. The assets of the aerial cell 503 can be considered as the resources of the aerial cell 503, which are shared amongst the 'N' terrestrial network operators. In this example, the sharing concept applies to Multi-Operator Core Networking (MOCN).

The aerial cell 503 is deployed in order to increase the capacity of the terrestrial network operators. The aerial cell 503 can connect with devices (User Equipment (UE)) 501 and 502, which can belong to the subscribers of operator-1 and operator-2, using radio links (air interface). The aerial cell 503 is connected to network elements of the terrestrial network operators using backhaul links. The network elements of the terrestrial network operators are base stations that are located within the coverage areas of the respective terrestrial network operators. The base stations located within the coverage area of a terrestrial network operator can be connected to each other using radio links, and the corresponding core networks (labeled as core network-1, core network-2, . . . , and core network-N) using backhaul links. The UEs 501 and 502, belonging to operator-1 and operator-2 respectively, can be simultaneously connected to the respective operator's base stations and the aerial cell 503 using either of Carrier Aggregation (CA) or Dual Connectivity (DC).

The communication between the aerial cell 503 and the base stations of the terrestrial network operators, and the communication between the aerial cell 503 and the UEs 501 and 502 is established using wireless links. The links between the aerial cell 503 and the base stations of the terrestrial network operators can be established using Point to Point (P2P) or Integrated Access Backhaul (IAB). If the communication is established using P2P, the frequencies used for communication between the aerial cell 503 and the UEs 501 and 502, and the frequencies used for communication between the aerial cell 503 and the base stations are dedicated (different). If the communication is established using IAB, the frequencies used for communication between the aerial cell 503 and the UEs 501 and 502, and the frequencies used for communication between the aerial cell 503 and the base stations are same.

Consider that an aerial cell 503 has been deployed to increase the capacity of the terrestrial network operators. The aerial cell 503 is deployed when one or more terrestrial network operators do not have sufficient resources for providing services to their respective subscribers. Consider that at a certain point of time, the resources of the aerial cell 503 are shared amongst operator-1 and operator-2. The aerial cell 503 is deployed, and operator-1 and operator-2 are augmented by the aerial cell 503, when there is a demand for resources from operator-1 and operator-2. Operator-1 and operator-2 can raise demands for resources, when it is detected that operator-1 and operator-2 do not have sufficient resources for providing services to their respective subscribers. It may be noted that if there is demand for resources from a single terrestrial network operator, the resources of the aerial cell 503 can be dedicated to the terrestrial network operator exclusively.

As depicted in FIG. 5, a UE 501 is in the coverage area of operator-1 and a UE 502 is in the coverage area of operator-2. The coverage area of an operator (1-N) may include a plurality of cells (terrestrial cells), wherein each cell may include one or more base stations. The UE 501 and UE 502 are connected to the aerial cell 503 through air interfaces, i.e., radio links. In an embodiment, a subscriber device (for example: UE 501/502) may be connected to the aerial cell 503 indirectly through a base station that is within the coverage area of an operator (1-N).

The operator-1 or operator-2 may share assets of the aerial cell 503, which include spectrum, aerial cell mount, aerial RAN, and backhaul. The spectrum refers to frequencies used for communication between the aerial cell 503 and the devices such as UE 501 and the UE 502. The backhaul refers to backhaul links between the aerial cells (including aerial cell 503 and other aerial cells (not shown)), backhaul links between the aerial cell 503 and the base stations in the coverage areas of the terrestrial network operators, and the backhaul links between the base stations and the respective core networks (core network-1, core network-2, and so on). The aerial cell mount can host the aerial RAN that can be shared between the operators. The aerial asset manager 504 can enable the sharing of the assets of the aerial cell 503.

FIG. 6 depicts a system 600 configured to enable on-demand deployment of an aerial cell 503 to increase the capacity of terrestrial network operators, and sharing of assets of the aerial cell 503 amongst the terrestrial network operators, according to embodiments as disclosed herein. As depicted in FIG. 6, the system 600 comprises of the aerial cell 503, N UEs 601A-601N, N access networks 602A-602N, N core networks 603A-603N, and the aerial asset manager 504. The access network 602A and the core network 603A belong to a first terrestrial network operator. Similarly, the access networks 602B and 602N, and the core networks 603B and 603N belong to the second and $N^{th}$ terrestrial network operators respectively. The UEs 601A, 6018, and 601N, belong to subscribers of first, second, and $N^{th}$ terrestrial network operators respectively.

For the sake of simplicity, the system 600 is depicted to include a single aerial cell 503. However, the system 503 can include (deploy) a plurality of aerial cells to dynamically increase the capacity of the terrestrial network operators based on an on-demand basis. Further, each of the terrestrial network operators is depicted to include a single base station in the access network, and a single UE is present in the coverage area of each terrestrial network operator. Each terrestrial network operator, however, can comprise a plurality of cells, wherein each cell can include one or more base stations and a plurality of UEs.

The aerial asset manager 504 allows the terrestrial network operators to share the assets of the aerial cell 503 if the terrestrial network operators require additional resources to provide services to their respective subscribers. In an embodiment, the aerial asset manager 504 can be deployed as an Infrastructure as a Service (IaaS). When the aerial asset manager 504 is deployed as an IaaS, the aerial asset manager 504 is an entity that is external to the terrestrial network operators. In another embodiment, the functionalities of the aerial asset manager 504, and units of the aerial asset manager 504 that are configured to perform associated functionalities, can be located in one or more network elements of one or more access networks (602A-602N), and one or more core networks (603A-603N). In this scenario, the different functionalities of the aerial asset manager 504 can be split among one or more terrestrial network operators. In yet another embodiment, each of the terrestrial network operators can configure dedicated nodes for implementing the functionalities of the aerial asset manager 504. In this scenario, the different functionalities of the aerial asset manager 504 can be distributed amongst the dedicated nodes of the terrestrial network operators, or each of the nodes can periodically accept the role of the aerial asset manager 504.

For the sake of simplicity the aerial asset manager 504 is depicted to be deployed as an IaaS. The embodiments include configuring different interfaces and different messaging protocols for enabling communication between the aerial asset manager 504 and the terrestrial network elements (access networks (602A-602N), and core networks (603A-603N)), based on the deployment of the aerial asset manager 504 as an external entity, as part of the terrestrial networks, or as a dedicated node in the terrestrial networks. The interfaces and messaging protocols allow obtaining information pertaining to the capacity of the terrestrial cells belonging to the terrestrial networks.

The aerial asset manager 504 includes architectures that are configured for sharing of the assets of the aerial cell 503. The different assets available for sharing are aerial cell mount, backhaul, aerial RAN, and spectrum. The architectures provide different options for sharing and non-sharing of the aerial assets of the aerial cell 503. The architectures include shared aerial cell mount, shared backhaul, aerial Multi-Operator Radio Access Networking (MORAN), and aerial Multi-Operator Core Networking (MOCN). The concept of active RAN sharing applies to MOCN, MORAN, and Gateway Core Networking (GWCN). In GWCN, the RAN network elements and core network elements can be shared amongst the terrestrial network operators.

The following table (Table-1) depicts the different options of sharing and non-sharing of the aerial assets in each of the architectures, viz., shared aerial cell mount, shared backhaul, aerial MORAN, and aerial MOCN.

TABLE 1

| | Sharing Architecture | | | |
| --- | --- | --- | --- | --- |
| Aerial Assets | Shared Aerial Cell Mount | Shared Backhaul | Aerial MORAN | Aerial MOCN |
| Backhaul | Not Shared | Shared | Shared | Shared |
| Aerial RAN | Not Shared | Not Shared | Shared | Shared |
| Aerial Cell Mount | Shared | Shared | Shared | Shared |
| Spectrum | Not Shared | Not Shared | Not Shared | Shared |

The aerial asset manager 504 can employ one of the architectures for sharing of one or more assets of the aerial cell 503 based on sharing agreements between the terrestrial network operators. The assets of the aerial cell 503 have been referred to as resources of the aerial cell 503 at appropriate instances. The assets or resources of the aerial cell 503 enhance the capacity of the terrestrial network operators.

The aerial asset manager 504 ensures that there is an effective utilization of the resources of the aerial cell 503 through the sharing of aerial assets of the aerial cell 503 amongst the terrestrial network operators. The aerial asset manager 504 is configured to manage the deployment and trajectory of the aerial cell 503 such that the resources of the deployed aerial cell 503 are effectively utilized. The effective utilization of the resources of the deployed aerial cell 503 amongst the terrestrial network operators ensures that the unutilized portion of resources (assets) of the deployed aerial cell 503 is minimized. The aerial asset manager 504 includes a terrestrial data traffic predictor 604, an aerial cell fleet manager 605, and an aerial sharing manager 606.

The terrestrial data traffic predictor 604 is configured to predict the data traffic pertaining to each cell of each of the terrestrial network operators. In an embodiment, the terrestrial data traffic predictor 604 may be a part of the network elements of the terrestrial network operators, i.e., the access networks 602A-602N and the core networks (603A-603N). The terrestrial data traffic predictor 604 is configured to report the aerial asset manager 504 about the capacity of the cells of the terrestrial network operators and/or request the aerial cell fleet manager 605 in the aerial asset manager 504 to deploy an aerial cell (503), which is configured to manage the aerial cell fleet.

Consider that $P_{OP_iC_j}(t)$ is the forecasted data traffic pertaining to the $j^{th}$ ($j \in 1-M$) cell (consider that each operator (1-N) is having M cells) of the $i^{th}$ ($i \in 1-N$) operator at a time instant 't'. In an embodiment, the terrestrial data traffic predictor 604 can utilize neural network models such as Auto-Regressive Integrated Moving Average (ARIMA), Feed Forward Neural Network (FFNN), Recurrent Neural Network (RNN), Long Short-Term Memory (LSTM), and so on, to forecast the data traffic pertaining to the cells of the operators.

The $P_{OP_iC_j}(t)$ can be expressed in terms of a trained deep learning (neural network) model hypothesis transfer function $h_{model}$ (input). The deep learning model can operate over an input sequence x(t−1) of data traffic till the time instant 't' and predict an output data traffic y(t). The forecasted data traffic pertaining to the $j^{th}$ cell of the $i^{th}$ operator at a time instant 't' is given by:

$$P_{OP_iC_j}(t) = h_{model}(\text{data traffic sequence}_{OP_iC_j}) \quad \text{(equation 1)}$$

The data traffic pertaining to each terrestrial cell of each operator (1-N) indicates the capacity that is required by the terrestrial cell to provide services. However, the capacity of a terrestrial cell is limited. The capacity can refer to the resources of the terrestrial cell. The resources of the terrestrial cell may not be sufficient to support the predicted data traffic of the terrestrial cell.

The terrestrial data traffic predictor 604 can configure a threshold capacity ($Th_C$) for each terrestrial cell of each of the operators. When the demand for resources to support the predicted data traffic is such that a terrestrial cell of an operator requires having a capacity that is greater than the threshold capacity, then the aerial cell 503 is deployed. The aerial cell 503 can provide its resources (assets) for increasing the capacity (resources) of the terrestrial cell for fulfilling the demand for resources. Therefore, if the terrestrial data traffic predictor 604 predicts, at the time instant 't', that the capacity (resources) required for providing services to the $j^{th}$ cell of the $i^{th}$ operator is likely to exceed $Th_C$ at time instant 't+1', the terrestrial data traffic predictor 604 indicates the aerial cell fleet manager 605 that the terrestrial cell j of the operator i requires augmentation by the aerial cell 503. The aerial cell fleet manager 605 can deploy the aerial cell 503 in cell j of the operator i at the time instant 't+1', for increasing the capacity of the terrestrial cell j (to meet the demand for resources).

Consider that $uA_{OP_iC_j}(t)$ defines whether the $j^{th}$ cell of the $i^{th}$ operator requires augmentation by the aerial cell 503. If the value of $uA_{OP_iC_j}(t)$ is 1, then the $j^{th}$ cell of the $i^{th}$ operator requires augmentation by the aerial cell 503. Similarly, if the value of $uA_{OP_iC_j}(t)$ is 0, then the $j^{th}$ cell of the $i^{th}$ operator does not require augmentation by the aerial cell 503. The $uA_{OP_iC_j}(t)$ can be represented in the form of a condition given as:

$$uA_{OP_iC_j}(t) = \begin{cases} 1 & \text{if } P_{OP_iC_j}(t) > Th_C \\ 0 & \text{otherwise} \end{cases} \quad \text{(equation 2)}$$

The aerial cell fleet manager 605 can deploy aerial cells (503) to increase the capacities (resources) of the M cells of the N terrestrial network operators, based on the forecasted data traffic pertaining to the M cells of the N terrestrial network operators. The aerial cell fleet manager 605 can determine the aerial fleet size, i.e., the total number of aerials cells (503) required for satisfying the demand, for resources, of the M cells of the N terrestrial network operators for supporting the predicted data traffic. The aerial cell fleet can be determined based on a consideration that the aerial cells (503) are not shared amongst the terrestrial network operators.

Consider that the $j^{th}$ cell of the $i^{th}$ operator may require one or more aerial cells (503) to support the demand for resources. The number of aerial cells (503) required for supporting the data traffic of the $j^{th}$ cell of the $i^{th}$ operator at the time instant 't' can be determined based on the extent the capacity required to support the forecasted data traffic pertaining to the $j^{th}$ cell of the $i^{th}$ operator is greater than the threshold capacity of the $j^{th}$ cell of the it operator, i.e., $(P_{OP_iC_j}(t)-Th_C)$; and the amount of resources (assets) of the aerial cells (503) that has been left unutilized, i.e., $(M_A-P_{OP_iC_j}(t)-Th_C)$, wherein $M_A$ is the capacity of the aerial cell 503.

The total number of aerials cells (503) required for satisfying the capacity (resource) demand of M cells of each of the N operators at the time instant 't', considering that the aerial cells (503) are not shared amongst the N terrestrial network operators, can be expressed as: $Tot_{NS_A}=$ $$\max_{0<t<T}\left(\sum_{i=1}^{i=N}\sum_{j=1}^{j=M}\left(\left(\left[\frac{(P_{OP_iC_j}(t)-Th_C)}{M_A}\right]\right)\right)\right)+ \quad \text{(equation 3)}$$

$$\left(\left[\frac{(M_A)\times\left(\left[\frac{(P_{OP_iC_j}(t)-Th_C)}{M_A}\right]\right)-(P_{OP_iC_j}(t)-Th_C))}{M_A}\right]\right)\times uA_{OP_iC_j}(t)\right)$$

Consider that the $j^{th}$ cell of the $i^{th}$ operator is not able to utilize the resources (assets) of the aerial cells (503) completely, which was deployed for supporting the demand for resources (capacity) for supporting the predicted data traffic pertaining to the $j^{th}$ cell of the $i^{th}$ operator. The portion of the capacity (resources/assets) of the aerial cells (503) that is un-utilized by the $j^{th}$ cell of the $i^{th}$ operator, considering that the assets of the aerial cells (503) are not shared amongst the terrestrial network operators, is given by:

$$RemNSA_{OP_iC_j}(t) = \quad \text{(equation 4)}$$

$$\left((M_A)\times\left(\left[\frac{(P_{OP_iC_j}(t)-Th_C)}{M_A}\right]\right)-(P_{OP_iC_j}(t)-Th_C)\right)\times uA_{OP_iC_j}(t)$$

The total un-utilized capacity of all the aerial cells (503) that have been deployed for supporting the demand, for resources, of the M cells of N operators, considering that the aerial cells (503) are not shared amongst the terrestrial network operators, is an integral sum of equation (4), which is given by:

$$Tot_{NS_{RemA}} = \int_{t=0}^{t=T}\sum_{i=1}^{i=N}\sum_{j=1}^{j=M} RemNSA_{OP_iC_j}(t)\,dt \quad \text{(equation 5)}$$

Considering that the $j^{th}$ cell of the $i^{th}$ operator is not able to utilize the resources of the aerial cells (503) in its entirety, the aerial sharing manager 606 can use sharing mechanisms to allocate the utilized resources to other terrestrial cells of other operators. The sharing mechanisms include fair scheduling, First Come First Serve (FCFS), soft partitioning, prioritized scheduling, and so on. In an embodiment, the un-utilized capacity (given in equation-4) can be opportunistically allocated to a terrestrial cell j of an operator k.

The total number of aerial cells (503) required for satisfying the capacity (resource) demand of M cells of each of the N operators at the time instant 't' for supporting the predicted data traffic of M cells of the N operators, considering that the assets of the aerial cells (503) are shared amongst the M cells of the N operators, is given by:

$$Tot_{S_A} = \max_{0<t<T}\left(\left(\sum_{k=1}^{i=N}\sum_{k=1}^{k=N}\sum_{j=1}^{j=M}\left[\frac{(P_{OP_kC_j}(t)-Th_{Ccap}-RemNSA_{OP_iC_j}(t))}{M_A}\right]\right)+\right. \quad \text{(equation 6)}$$

$$\left.\left(\left[\frac{(M_A)\times\left(\left[\frac{(P_{OP_kC_j}(t)-Th_C-RemNSA_{OP_iC_j}(t))-}{M_A}\right]\right)}{M_A}\right]\right)_{\forall i\neq k}\times uA_{OP_iC_j}(t)\right)$$

The number of aerial cells (503) that are required for supporting the demand, for resources, of the M cells of N operators (given in equation-6), considering the aerial cells (503) are shared amongst the M cells of the N operators, is less compared to that when considering that the aerial cells (503) are not shared amongst the M cells of the N operators. The reduction in the number of aerial cells (503) (by comparing equation-3 and equation-6) can be derived by applying equation-4 in numerator of equation-3 for the terrestrial cell j of the operator k.

The portion of the capacity of the aerial cells (503) that is un-utilized, considering that the aerial cells (503) are shared amongst the terrestrial network operators, is given by:

$$Tot_{SRemA} = \int_0^{t=T} \sum_{i=1}^{i=N} \sum_{k=1}^{k=N} \sum_{j=1}^{j=M} \left( \left( (M_A) \times \left[ \frac{(P_{OP_k C_j}(t) - Th_C - RemNSA_{OP_i C_j}(t))}{M_A} \right] \right) - \left( (P_{OP_k C_j}(t) - Th_C - RemNSA_{OP_i C_j}(t)) \right)_{\forall i \neq k} \times uA_{OP_i C_j}(t) \right) dt \quad \text{(equation 7)}$$

The un-utilized portion of the capacity of the aerial cells (503), i.e., equation-7, can be obtained by applying equation-4 in equation-5. The improvement in resource utilization of the aerial cells (503), by enabling the operators (1–N) to share the assets of the aerial cells (503), compared to the scenario wherein the assets of the aerial cells (503) are not shared amongst the operators (1–N) is given by:

$$\gamma = \frac{(Tot\_NS\_Rem_A - Tot\_S\_Rem_A) \times 100}{Tot\_NS\_Rem_A} \quad \text{(equation 8)}$$

The aerial asset manager 504 optimizes deployment of the aerial cells (503) based on the forecasted data traffic pertaining to the cells of the operators, and effective utilization of the deployed aerial cells (503) by enabling sharing of the assets of the deployed aerial cells (503) amongst the cells of the operators. The aerial asset manager 504 attempts to minimize the value of equation-7, and thereby maximize the value of equation-8.

The sharing of the aerial assets allows increased rollout speed, instant expansion of capacity and coverage area of the terrestrial network operators, effective utilization of resources of the aerial cell 503, sharing of license cost, and lowering of maintenance cost pertaining to capital expenditure (CAPEX) and operational expenses (OPEX).

FIG. 6 shows exemplary units of the system 600, but it is to be understood that other embodiments are not limited thereon. In other embodiments, the system 600 may include less or more number of devices and units. Further, the labels or names of the devices and units of the system 600 are used only for illustrative purpose and does not limit the scope of the invention. One or more devices and units can be combined together to perform same or substantially similar function in the system 600.

FIG. 7 is a flowchart 700 depicting a method for enabling on-demand deployment of aerial cells (503) for increasing the capacity of terrestrial network operators, and sharing of aerial assets of the deployed aerial cells (503) amongst the terrestrial network operators, according to embodiments as disclosed herein. At step 701, the method includes predicting that the capacity of at least one terrestrial cell of at least one terrestrial network operator is not sufficient to provide services to the subscribers of the at least one terrestrial network operator. The embodiments include predicting that the at least one terrestrial cell will not be able to support the continuation of services at a future time instant.

In an embodiment, the prediction is performed using neural network models. The neural network modes can analyze the data traffic of the at least one terrestrial cell belonging to the at least one terrestrial network operator at different times. The embodiments include analyzing data traffic of the at least one terrestrial cell over a period of time. The embodiments include predicting the time periods during which the at least one capacity of the at least one terrestrial cell will not be sufficient to support the data traffic of the at least one terrestrial cell at those time periods.

At step 702, the method includes deploying at least one aerial cell (503) to increase the capacity of the at least one terrestrial cell based on the predicted insufficiency. The at least one aerial cell (503) can be deployed in the coverage area of the at least one terrestrial cell at the time instances during which the capacity of the at least one terrestrial cell has been predicted to be insufficient for supporting continuation of services. The embodiments include determining the number of aerial cells (503) that are required for compensating the insufficiency of resources. The number of required aerial cells (503) can be determined based on the capacities of the aerial cells (503) and the degree of insufficiency.

The embodiments include determining the extent by which the capacity of the at least one terrestrial cell is less than an actual capacity required to support the continuation of services. The embodiments include determining whether the actual capacity required to support the continuation of services is greater than the capacity of a single aerial cell (503). This allows determining whether multiple aerial cells (503) are required for supporting the traffic of the at least one terrestrial cell. The embodiments include determining the number of required aerial cells (503) to increase the capacity of the at least one terrestrial cell to the actual required capacity, based on the difference between the actual capacity required to support the continuation of services and the capacity of the at least one terrestrial cell, and the difference between the actual capacity required to support the continuation of services and the capacity of the at least one aerial cell (503).

At step 703, the method includes enabling the sharing of at least one asset of the at least one aerial cell (503) based on at least one sharing architecture. The embodiments include providing architectures for sharing and non-sharing of one or more assets of the at least one aerial cell (503). The assets of the at least one aerial cell (503) include aerial cell mount, backhaul, aerial RAN, and spectrum. The architectures include shared aerial cell mount, shared backhaul, aerial MORAN, and aerial MOCN. In shared aerial cell mount architecture, the aerial cell mount is shared amongst the at least one terrestrial cell, whereas the backhaul, the aerial RAN, and the spectrum are not shared. In shared backhaul architecture, the aerial cell mount and the backhaul are shared amongst the at least one terrestrial cell, whereas the aerial RAN and the spectrum are not shared. In aerial MORAN architecture, the aerial cell mount, the backhaul, and the aerial RAN are shared amongst the at least one terrestrial cell, whereas the spectrum is not shared. In aerial MOCN architecture, the aerial cell mount, the backhaul, the aerial RAN, and the spectrum are shared amongst the at least one terrestrial cell.

The embodiments include ensuring effective utilization of the at least one aerial asset of the at least one aerial cell (503) through the sharing of at least one aerial asset of the at least one aerial cell (503). The embodiments optimize the deployment of the at least one aerial cell (503) such that the resources (at least one aerial asset) of the deployed at least one aerial cell (503) is completely utilized through the sharing of the resources of the at least one aerial cell (503). The portion of the capacity (at least one aerial asset or resource) of the at least one aerial cell (503) that is unutilized is allocated to at least one other terrestrial cells. The embodiments include ensuring that unutilized portion of resources is minimized.

The various actions in the flowchart 700 may be performed in the order presented, in a different order, or simultaneously. Further, in some embodiments, some actions listed in FIG. 7 may be omitted.

The embodiments disclosed herein can be implemented through at least one software program running on at least one hardware device and performing network management functions to control the network elements. The network elements shown in FIG. 6 include blocks which can be at least one of a hardware device, or a combination of hardware device and software module.

The embodiments disclosed herein describe methods and systems for enabling the sharing of aerial infrastructure of aerial cells among a plurality of terrestrial network operators, and enabling on-demand deployment of the aerial cells and associated platforms. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, a hardware means, for example, an Application-specific Integrated Circuit (ASIC), or a combination of hardware and software means, for example, an ASIC and a Field Programmable Gate Array (FPGA), or at least one microprocessor and at least one memory with software modules located therein. The method embodiments described herein could be implemented partly in hardware and partly in software. Alternatively, the invention may be implemented on different hardware devices, e.g. using a plurality of Central Processing Units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A method for sharing aerial assets of at least one aerial cell, the method comprising:
   predicting, by an aerial asset manager, a requirement of capacity for supporting data traffic pertaining to at least one terrestrial cell belonging to at least one terrestrial operator;
   deploying, by the aerial asset manager, the at least one aerial cell, if required capacity of the at least one terrestrial cell is greater than a threshold capacity; and
   sharing, by the aerial asset manager, at least one asset of the at least one aerial cell amongst the at least one terrestrial cell based on at least one sharing architecture,
   wherein deploying the at least one aerial cell includes managing the trajectory of the at least one aerial cell to bring it to a region in which the at least one aerial cell can share the at least one asset with the at least one terrestrial cell when it is determined that the required capacity of the at least one terrestrial cell is greater than the threshold capacity.

2. The method, as claimed in claim 1, wherein the requirement of capacity is determined based on analysis of data traffic pattern, by a neural network model, of the at least one terrestrial cell for a predefined time period.

3. The method, as claimed in claim 1, wherein number of at least one aerial cell to be deployed is determined based on at least one of: capacity of the at least one aerial cell, and a difference between the required capacity of the at least one terrestrial cell and the threshold capacity.

4. The method, as claimed in claim 1, wherein the at least one asset of the at least one aerial cell comprises a backhaul for communication between the at least one aerial cell and at least one network element of the at least one terrestrial cell, an aerial mount for hosting the at least one aerial cell, a spectrum for communication between the at least one aerial cell and at least one devices in the at least one terrestrial cell, and an aerial Radio Access Network (RAN) in the at least one aerial cell.

5. The method, as claimed in claim 4, wherein the at least one sharing architecture allows sharing of at least one of the backhaul, the aerial mount, the spectrum and the aerial RAN amongst the at least one terrestrial cell.

6. The method, as claimed in claim 3, wherein the method further comprises allocating an unutilized portion of the at least one capacity of the at least one aerial cell to at least one other terrestrial cell.

7. The method, as claimed in claim 1, wherein at least one link between the aerial cell and at least one base station in the at least one terrestrial cell, and at least one link between the aerial cell and at least one User Equipment (UE), is established using Point to Point (P2P) connection.

8. The method, as claimed in claim 1, wherein at least one link between the aerial cell and at least one of: at least one UE and at least one base station in the at least one terrestrial cell, is established using Integrated Access Backhaul (IAB) connection.

9. An aerial asset manager for sharing aerial assets of at least one aerial cell, the aerial asset manager, configured to:
   predict a requirement of capacity for supporting data traffic pertaining to at least one terrestrial cell belonging to at least one terrestrial operator;
   deploy the at least one aerial cell, if required capacity of the terrestrial cell is greater than a threshold capacity; and share at least one asset of the at least one aerial cell amongst the at least one terrestrial cell based on at least one sharing architecture, wherein deploying the at least one aerial cell includes managing the trajectory of the at least one aerial cell to bring it to a region in which the at least one aerial cell can share the at least one asset with the at least one terrestrial cell.

10. The aerial asset manager, as claimed in claim 9, wherein the requirement of capacity is determined based on analysis of data traffic pattern, by a neural network model, of the at least one terrestrial cell for a predefined time period.

11. The aerial asset manager, as claimed in claim 9, wherein number of at least one aerial cell to be deployed is determined based on at least one of: capacity of the at least one aerial cell, and a difference between the required capacity of the at least one terrestrial cell and the threshold capacity.

12. The aerial asset manager, as claimed in claim 9, wherein the at least one asset of the at least one aerial cell comprises a backhaul for communication between the at least one aerial cell and at least one network element of the at least one terrestrial cell, an aerial mount for hosting the at least one aerial cell, a spectrum for communication between the at least one aerial cell and at least one devices in the at least one terrestrial cell, and an aerial Radio Access Network (RAN) in the at least one aerial cell.

13. The aerial asset manager, as claimed in claim 12, wherein the at least one sharing architecture allows sharing of at least one of the backhaul, the aerial mount, the spectrum and the aerial RAN amongst the at least one terrestrial cell.

14. The aerial asset manager, as claimed in claim 11, wherein the aerial asset manager is further configured to allocate an unutilized portion of the at least one capacity of the at least one aerial cell to at least one other terrestrial cell.

15. The aerial asset manager, as claimed in claim 9, wherein at least one link between the aerial cell and at least one base station in the at least one terrestrial cell, and at least one link between the aerial cell and at least one User Equipment (UE), is established using Point to Point (P2P) connection.

16. The aerial asset manager, as claimed in claim 9, wherein at least one link between the aerial cell and at least one of: at least one UE and at least one base station in the at least one terrestrial cell, is established using Integrated Access Backhaul (IAB) connection.

* * * * *